(12) United States Patent
Nageshkar et al.

(10) Patent No.: US 10,899,257 B2
(45) Date of Patent: Jan. 26, 2021

(54) AUTOMOTIVE FOAMLESS SEAT MADE FROM FLEXIBLE MATERIAL

(71) Applicant: Ford Global Technologies, LLC, Dearborn, MI (US)

(72) Inventors: Vishal Vinayak Nageshkar, Farmington Hills, MI (US); John Wayne Jaranson, Dearborn, MI (US); Sangram Laxman Tamhankar, Dearborn, MI (US); Michael James Whitens, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 16/166,910

(22) Filed: Oct. 22, 2018

(65) Prior Publication Data
US 2020/0122616 A1    Apr. 23, 2020

(51) Int. Cl.
*B60N 2/70* (2006.01)
*B60N 2/68* (2006.01)

(52) U.S. Cl.
CPC ............. *B60N 2/7011* (2013.01); *B60N 2/68* (2013.01)

(58) Field of Classification Search
CPC ................ B60N 2/7011; B60N 2/68
USPC ....................................... 297/284.2
See application file for complete search history.

(56) References Cited

U.S. PATENT DOCUMENTS

| | | | | |
|---|---|---|---|---|
| 3,258,259 A * | 6/1966 | Bohlin | ............... | B60N 2/7052 297/284.2 X |
| 4,858,992 A * | 8/1989 | LaSota | ................... | B60N 2/002 297/284.2 |
| 5,058,952 A * | 10/1991 | LaSota | ..................... | A47C 7/28 297/284.2 |
| 7,044,551 B2 * | 5/2006 | Fujita | ...................... | B60N 2/66 297/284.2 |
| 7,963,594 B2 | 6/2011 | Wolas | | |
| 8,047,613 B1 | 11/2011 | Ahad | | |
| 8,052,213 B2 | 11/2011 | Dahlbacka et al. | | |

* cited by examiner

*Primary Examiner* — Anthony D Barfield
(74) *Attorney, Agent, or Firm* — David L. Coppiellie; Price Heneveld LLP

(57) ABSTRACT

A foamless seating assembly includes a frame having an inner support member and an outer support member. A first plurality of flexible straps extend about the inner support member of the frame. A second plurality of flexible straps extend about the outer support member of the frame. At least one flexible strap of the second plurality of flexible straps of the outer support member are adjacent to at least one flexible strap of the plurality of flexible straps of the inner support member. A tension assembly is operably coupled with the flexible straps and configured to apply tension to the straps simultaneously.

17 Claims, 8 Drawing Sheets

AUTOMOTIVE FOAMLESS SEAT MADE FROM FLEXIBLE MATERIAL

FIELD OF THE DISCLOSURE

The present disclosure generally relates to a seat for a vehicle, and more specifically, to a lightweight foamless seat that can be utilized in a vehicle in other possible applications.

BACKGROUND OF THE DISCLOSURE

Traditional seating assemblies typically add foam to provide comfort to the posterior of an occupant. However, the foam can be heavy, bulky, and may not conform to occupants of varying sizes. These traditional seating assemblies can also be quite warm, lending to discomfort when sitting in the vehicle in summer months. By eliminating the foam, more space is provided in the cabin of a vehicle, climate control in and around the seat can be more easily controlled, and comfort for a wide range of occupants of different sizes can be accommodated.

SUMMARY OF THE DISCLOSURE

According to one aspect of the present disclosure, a foamless seating assembly includes a frame having an inner support member and an outer support member. A first plurality of flexible straps extend about the inner support member of the frame. A second plurality of flexible straps extend about the outer support member of the frame. At least one flexible strap of the second plurality of flexible straps of the outer support member are adjacent to at least one flexible strap of the plurality of flexible straps of the inner support member. A tension assembly is operably coupled with the flexible straps and is configured to apply tension to the straps simultaneously.

Embodiments of the first aspect of the disclosure can include any one or a combination of the following features:
  wherein the inner support member is disposed at each side of a seat and the outer support member is disposed at outermost sides of seat side bolsters;
  wherein the tension assembly is disposed below a seat supported by the frame, the tension assembly including a horizontal shaft that extends rearwardly below the seat;
  wherein the horizontal shaft includes a first plurality of cams in engagement with the first plurality of flexible straps and a second plurality of cams in engagement with the second plurality of flexible straps;
  a vertical shaft extending upward from the seat and operably coupled with the horizontal shaft, the vertical shaft configured to apply or lessen tension on at least one of a third plurality of flexible straps and at least one of a fourth plurality of flexible straps, wherein the third plurality of flexible straps and fourth plurality of flexible straps are disposed in a seatback of said foamless vehicle seating assembly;
  wherein rotation of the tension assembly results in the application of tension to the first plurality of flexible straps which stiffens a seat supported by the frame; and
  wherein rotation of the tension assembly results in the application of tension to the second plurality of flexible straps which stiffens seat side bolsters supported by the frame.

According to a second aspect of the present disclosure, a vehicle seating assembly includes a frame defining a seat and a seatback. The frame includes an inner support member and an outer support member. A first plurality of flexible straps extend about the inner support member. A second plurality of flexible straps extend about the outer support member of the frame and are disposed adjacent one of the first plurality of flexible straps. A tension assembly is operably coupled with the flexible straps.

Embodiments of the second aspect of the disclosure can include any one or a combination of the following features:
  wherein the inner support member is disposed at each side of a seat and the outer support member is disposed at outermost sides of seat side bolsters;
  wherein the tension assembly is disposed below a seat supported by the frame, the tension assembly including a horizontal shaft that extends rearwardly below the seat;
  wherein the horizontal shaft includes a first plurality of cams in engagement with the first plurality of flexible straps and a second plurality of cams in engagement with the second plurality of flexible straps
  a vertical shaft extending upward from the seat and operably coupled with the horizontal shaft, the vertical shaft configured to apply or lessen tension on at least one of a third plurality of flexible straps and at least one of a fourth plurality of flexible straps, wherein the third plurality of flexible straps and fourth plurality of flexible straps are disposed in a seatback of said foamless vehicle seating assembly;
  wherein rotation of the tension assembly results in the application of tension to the first plurality of flexible straps which stiffens a seat supported by the frame; and
  wherein rotation of the tension assembly results in the application of tension to the second plurality of flexible straps which stiffens seat side bolsters supported by the frame.

According to a third aspect of the present disclosure, a vehicle seating assembly includes a frame having an inner support member and an outer support member. A first flexible strap extends about the inner support member. A second flexible strap extends out the outer support member of the frame and is disposed adjacent to the first flexible strap. A tension assembly is operably coupled with the first and second flexible straps and is configured to apply and lessen tension to the first and second flexible straps.

Embodiments of the third aspect of the disclosure can include any one or a combination of the following features:
  wherein the inner support member is disposed at each side of a seat and the outer support member is disposed at outermost sides of seat side bolsters;
  wherein a horizontal shaft of the tension assembly includes a first cam in engagement with the first flexible strap and a second cam in engagement with the second flexible strap;
  a vertical shaft extending upward from the seat and operably coupled with the horizontal shaft, the vertical shaft configured to apply or lessen tension on at least one of a third plurality of flexible straps and at least one of a fourth plurality of flexible straps, wherein the third plurality of flexible straps and fourth plurality of flexible straps are disposed in a seatback of said vehicle seating assembly;
  wherein rotation of the tension assembly results in the application of tension to the first flexible strap which stiffens a seat supported by the frame; and
  wherein rotation of the tension assembly results in the application of tension to the second flexible strap which stiffens seat side bolsters supported by the frame.

These and other aspects, objects, and features of the present disclosure will be understood and appreciated by those skilled in the art upon studying the following specification, claims, and appended drawings.

DETAILED DESCRIPTION

Figure 1A:
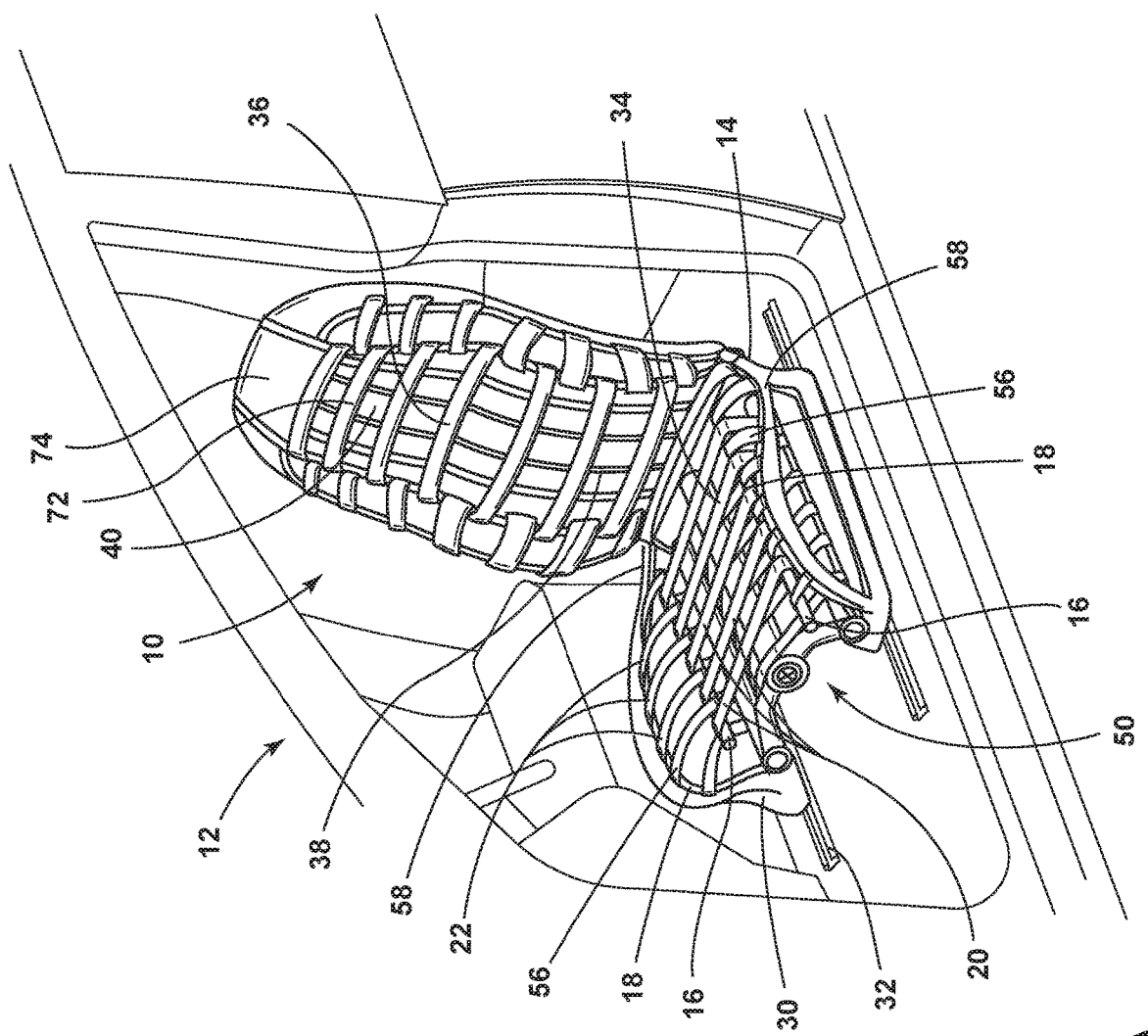
FIG. 1A is a top perspective view of one embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1A. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1A-8, reference numeral 10 generally designates a foamless seating assembly for a vehicle 12 that includes a frame 14 having an inner support member 16 and an outer support member 18. A first plurality of flexible straps 20 extends about the inner support member 16 of the frame 14. A second plurality of flexible straps 22 extends about the outer support member 18 of the frame 14. At least one of the second plurality of flexible straps 22 of the outer support member 18 is adjacent to at least one of the plurality of flexible straps 20 of the inner support member 16. A tensioning apparatus 50 (or tension assembly) is operably coupled with the first and second plurality of flexible straps 20, 22 and is configured to apply tension to the first and second plurality of flexible straps 20, 22 simultaneously.

Figure 1B:
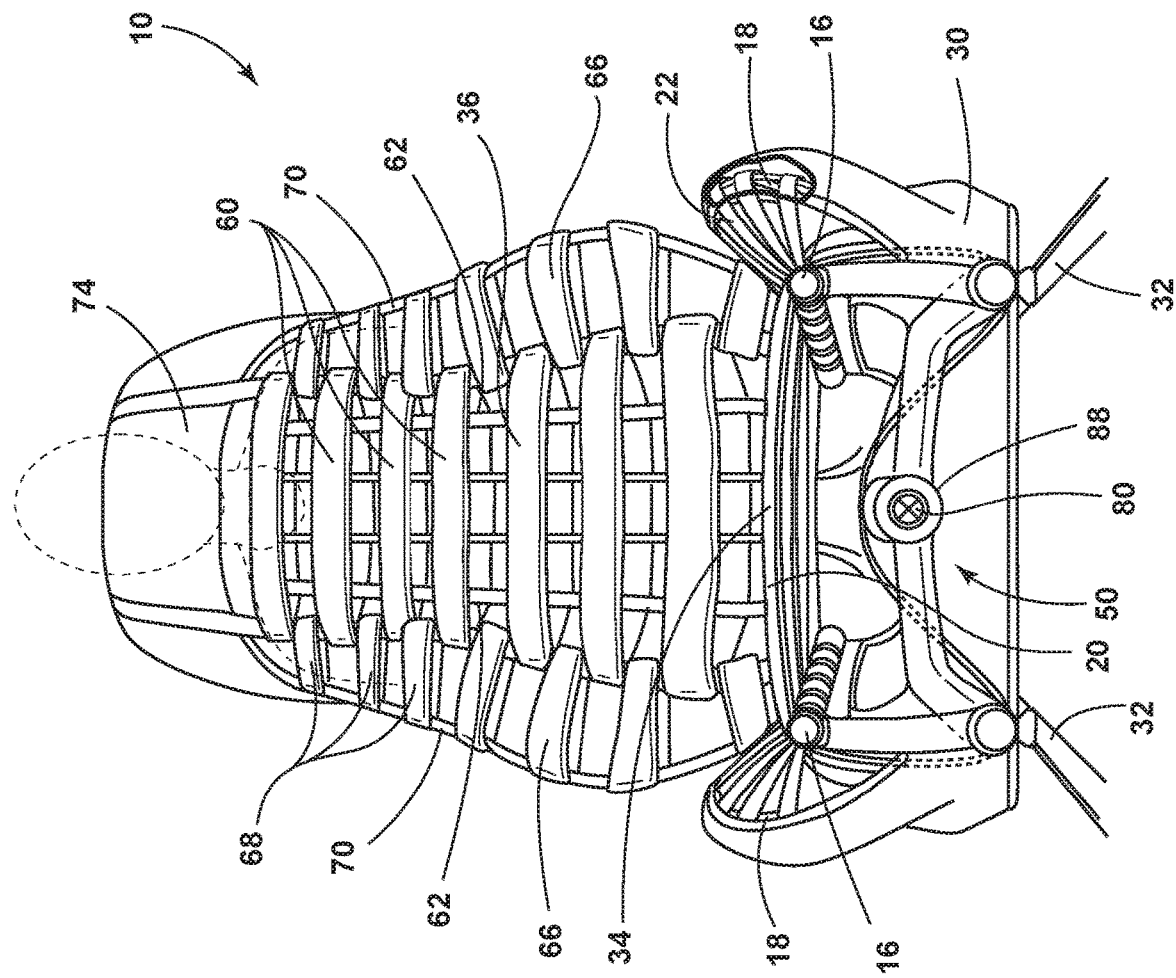
FIG. 1B is a front elevational view of a vehicle seating assembly of the present disclosure.

With reference to FIGS. 1A and 1B, the seating assembly 10 may be used in any vehicle 12, such as a car, a truck, a van, etc. It is also contemplated that the concept set forth in this disclosure may be utilized in a front or forward position of the vehicle 12 as well as a rear or rearward position of the vehicle 12. The seating assembly 10, as illustrated, includes a seat base 30 that is positioned on rail slides 32 to allow fore and aft movement of the seating assembly 10 relative to the vehicle 12. A seat 34 is operably coupled with the seat base 30 and is movable relative thereto, as set forth in further detail below. In addition, a seatback 36 of the seating assembly 10 includes a central area that includes a lower lumbar region 38 and an upper thoracic region 40 as well as a headrest 74. Each of the components of the seatback 36 may be configured for adjustability to properly support the weight of various occupants inside the vehicle 12.

With reference again to FIGS. 1A and 1B, the seating assembly 10 is generally configured to operate in a foamless condition. That is, the seat 34 and the seatback 36 of the seating assembly 10 do not include a foam cushion to provide cushion to the back and posterior of an occupant. Rather, the first and second plurality of flexible straps 20, 22, which can be tightened or loosened, are used to provide a seating surface to the user. To accommodate passengers of different sizes and different cushioning preferences, the seating assembly 10 is configured with a tensioning apparatus 50 that is configured to apply tension or remove tension from the first and second plurality of flexible straps 20, 22 that extend across the seat 34 and the seatback 36. The tensioning apparatus 50 will be discussed in further detail herein. It will be understood that the tensioning apparatus 50 may be configured to provide tension to the first plurality of flexible straps 20 or the second plurality of flexible straps 22, or adjust the tension in both the first plurality of flexible straps 20 and the second plurality of flexible straps 22 simultaneously. It will also be understood that although the first and second plurality of flexible straps 20, 22 are shown in alternating configuration (with each of the first plurality of flexible straps 20 disposed adjacent to or between each of the second plurality of flexible straps 22), variations to this configuration are also contemplated. Specifically, two or three of the first plurality of flexible straps 20 may be disposed between each of the second plurality of flexible strap 22. Conversely, two or three of the second plurality of flexible straps 22 may be disposed between each of the first plurality of flexible straps 20. In addition, the first and second plurality of flexible straps 20, 22 may include varying thicknesses across the seat 34 or seatback 36.

Figure 2:
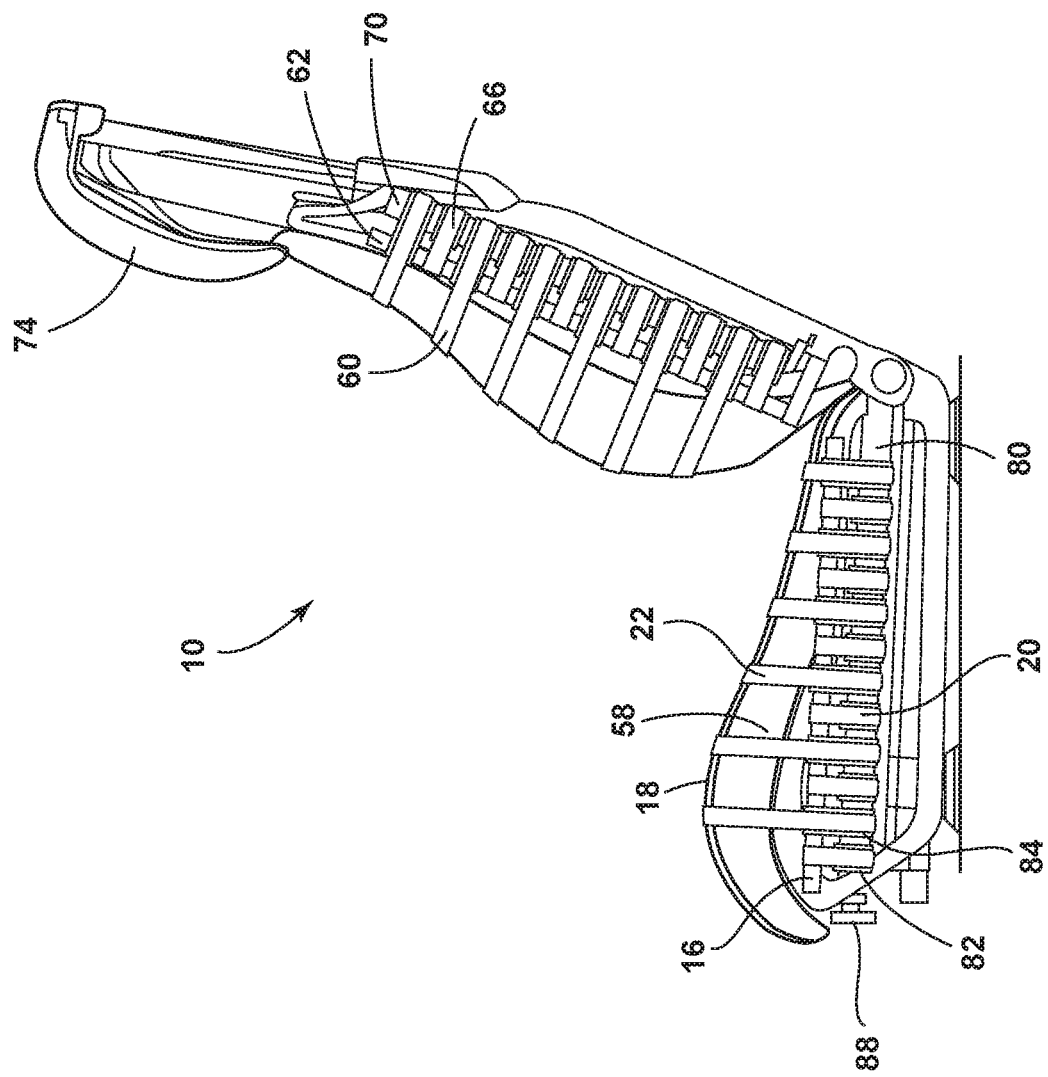
FIG. 2 is a side elevational view of one embodiment of a vehicle seating assembly of the present disclosure.

As illustrated in FIGS. 1A-2, the first plurality of flexible straps 20 extends across a middle portion of the seat 34 between the inner support members 16 of the frame 14. Thus, the first plurality of flexible straps 20 directly controls the firmness, and therefore, the comfort of a central portion of the seat 34. The second plurality of flexible straps 22 extends across seat side bolsters 56, on each side of the seat 34 between one of the inner support member 16 and an adjacent outer support member 18. Accordingly, firmness and comfort of the seat side bolsters 56 is controlled by the second plurality of flexible straps 22. The outer support member 18 may be covered by side support 58.

As shown in FIG. 1B, the central area of the seatback 36 includes a third plurality of flexible straps 60 that extend between inner support members 62 of the seatback 36. The third plurality of flexible straps 60 controls the firmness of the seatback 36. Further, the seatback 36 of the seating assembly 10 also includes seatback side bolsters 66. The seatback side bolsters 66 include a fourth plurality of flexible straps 68 that extend between each inner support member 62 of the seatback 36 and an adjacent outer support member 70 of the seatback 36. It will be understood that the seatback 36 may be pivotable relative to the seat 34 or adjusted based on adjustments to the seat 34. In addition, the tension in the third and fourth plurality of flexible straps 60, 68 that extend across the seatback 36 may be adjusted independently of the seat 34. An upper portion 72 of the seatback 36 may include a headrest 74. The headrest 74 may include flexible straps or may include a separate foam construction.

Figure 3:
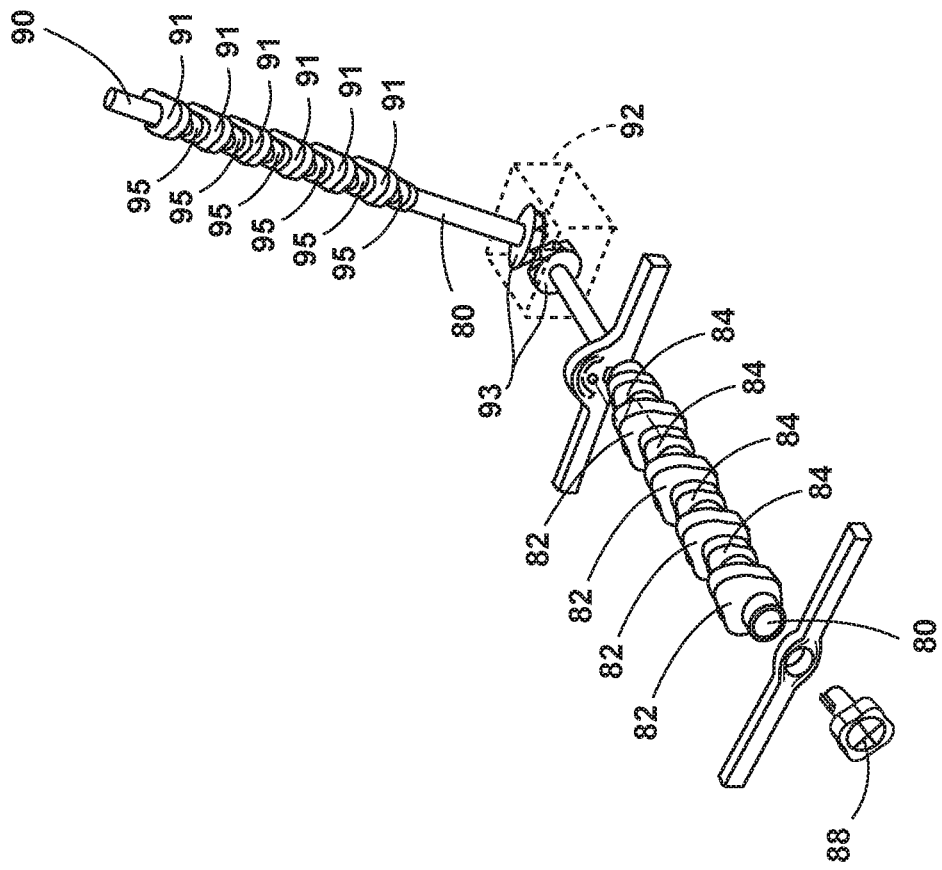
FIG. 3 is a top perspective exploded view of support components of a vehicle seating assembly of the present disclosure.

With reference now to FIGS. 2 and 3, the inner and outer support members 16, 18 of the seating assembly 10 are illustrated. The inner support members 16 are disposed at each side of the seat 34 inside the outer support members 18, which are disposed at outermost sides of the seat side bolsters 56. As illustrated, the tensioning apparatus 50 (FIG. 1B) may be disposed below the seat and supported by the frame 14. The tensioning apparatus 50 includes a horizontal shaft 80 that extends rearwardly below the seat 34. The horizontal shaft 80 includes a first plurality of cams 82 in engagement with the first plurality of flexible straps 20. The horizontal shaft 80 also includes a second plurality of cams 84 that are in engagement with the second plurality of flexible straps 22. It will be understood that the horizontal shaft 80 may include internal bearings to assist in rotation of the horizontal shaft 80 during use. The tensioning apparatus 50 also includes a knob 88. The knob 88 may be disposed seat forward and aligned with the horizontal shaft 80. Rotation of the horizontal shaft 80 by the knob 88 results in vertical movement of the horizontal shaft 80 up or down relative to the seating assembly 10, which consequently applies tension to, or removes tension from, the first and second plurality of flexible straps 20, 22.

Figure 4A:
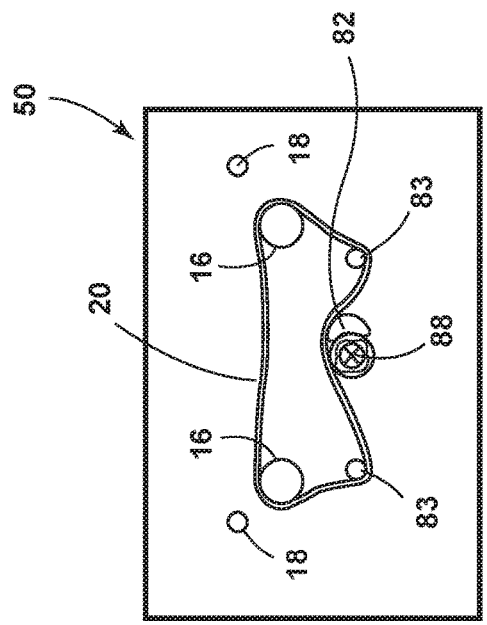
FIG. 4A is a schematic view of one embodiment of a tensioning system used for a seat in a vehicle seating assembly of the present disclosure prior to tensioning.
Figure 4B:
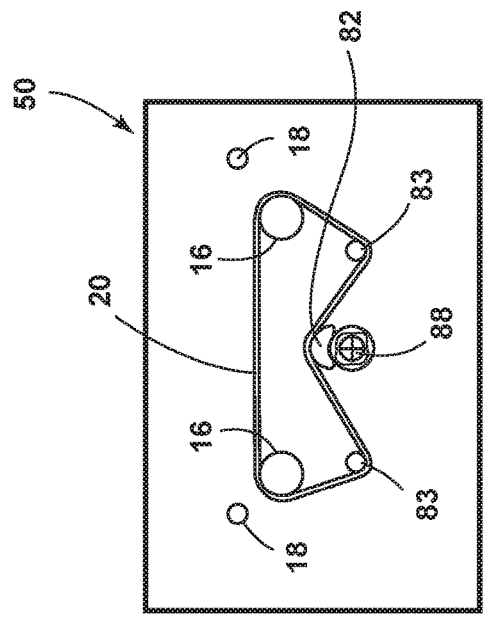
FIG. 4B is a schematic view of one embodiment of a tensioning system used for a seat in a vehicle seating assembly of the present disclosure after tensioning.

As shown in FIGS. 4A and 4B, the inner support members 16 are disposed at each side of the seat 34 and are in direct contact with the first plurality of flexible straps 20. As the tensioning apparatus 50 is adjusted (the knob 88 is rotated, thus rotating the first plurality of cams 82), the relative position of the first plurality of cams 82 on the horizontal shaft 80 changes, which may apply pressure to, or remove pressure from, the first plurality of flexible straps 20. Each of the first plurality of flexible straps 20 extends over one of the first plurality of cams around lower peripheral rollers 83, and then around the outer support members 18. As each of the first plurality of cams 82 pushes each of the first plurality of flexible straps 20 upward, the tension increases. This results in a change of perceived cushioning at the seating surface of the seat 34.

Figure 5A:
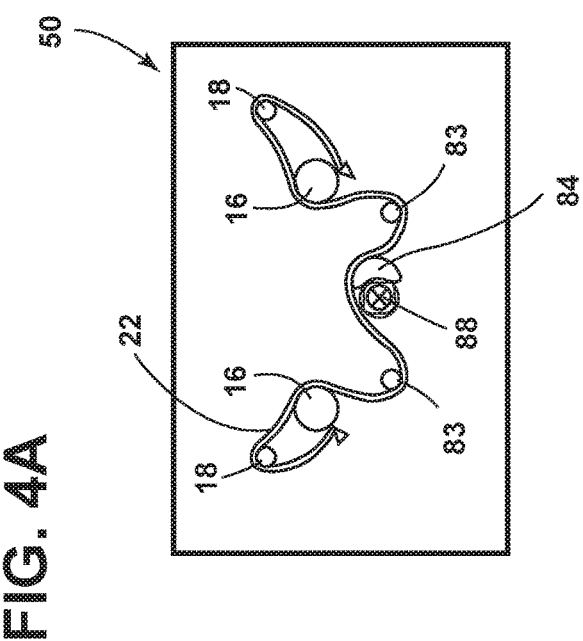
FIG. 5A is another schematic view of one embodiment of a tensioning system used for side bolsters in a vehicle seating assembly of the present disclosure prior to tensioning.
Figure 5B:
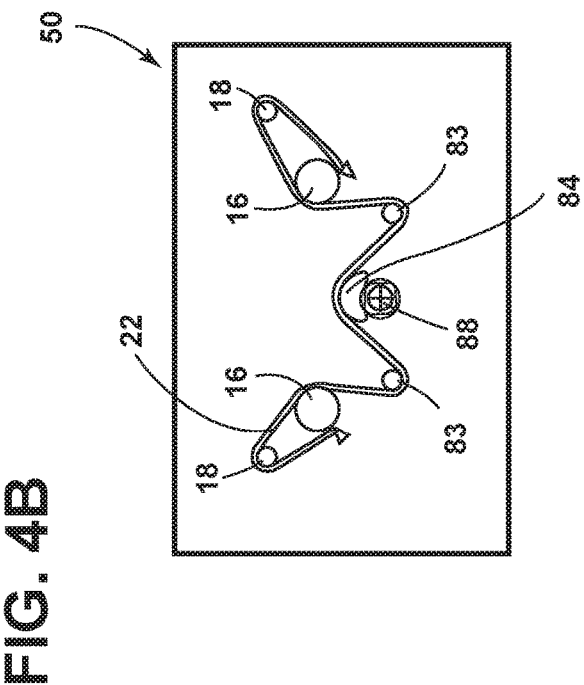
FIG. 5B is another schematic view of one embodiment of a tensioning system used for side bolsters in a vehicle seating assembly of the present disclosure after tensioning.

As shown in FIGS. 5A and 5B, the seat side bolsters 56 may also be adjusted. To adjust the firmness of the seat side bolsters 56, the knob 88 may be adjusted to rotate the second plurality of cams 84, which pushes each of the second plurality of flexible straps 22 upward (FIG. 5B). Each of the second plurality of flexible straps 22 extends over the second plurality of cams 84, below the lower peripheral rollers 83, around the inner support members 16, around the outer support members 18, and are secured to an underside of the inner support members 16. As the second plurality of cams 84 pushes the second plurality of flexible straps 22 upward, tension in the second plurality of flexible straps 22 increases. It is contemplated that the horizontal shaft 80 may be configured to operate in first and second conditions. In one instance, the knob 88 may be moved to one position (i.e., pulled linearly downward to a forward position), which results in the first plurality of cams 82 in contact with the first plurality of flexible straps 20 being tightened or loosened. The knob 88 may be moved to another position (i.e., an intermediate position), where the second plurality of cams 84 in contact with the second plurality of flexible straps 22 may be tightened or loosened. The knob 88 may also be adjustable to yet another position (i.e., a rearward position), where both the first and second plurality of flexible straps 20 and 22 may be tightened or loosened based on rotation of the first and second plurality of cams 82, 84. It is contemplated that the knob 88 may be moved inwardly and outwardly relative to the horizontal shaft 80.

With reference again to FIGS. 2-4, as previously noted, the seatback 36 also includes a similar construction and may be adjustable at the same time or independently of the seat 34. A vertical shaft 90 extends upwardly relative to the seat 34 and may be operably coupled with the horizontal shaft 80 at a junction box 92 and may be configured to apply tension or remove tension from the third plurality of flexible straps 60 and fourth plurality of flexible straps 68 via a third plurality of cams 91 and a fourth plurality of cams 95, respectively. The junction box 92 may include gears 93 or other features configured to convert rotation of the horizontal shaft 80 to rotation of the vertical shaft 90. As previously explained, it is contemplated that the third plurality of flexible straps 60 extends across an interior portion of the seatback 36 and the fourth plurality of flexible straps 68 extends across the seatback side bolsters 66. Various positions allow movement of the third plurality of flexible straps 60 alone, the fourth plurality of flexible straps 68 alone, or both the third and fourth plurality of flexible straps 60 and 68. Movement of the knob 88 to a first seatback adjustment position allows adjustment of the third plurality of flexible straps 60. When the knob 88 is in a second seatback adjustment position, the horizontal shaft 80 adjusts the second plurality of flexible straps 22. It is also contemplated that the first and second plurality of flexible straps 20, 22 may be adjusted simultaneously by rotation of the tensioning apparatus 50. Rotation of the tensioning apparatus 50 may apply tension to or remove tension from the first plurality of flexible straps 20 and the second plurality of flexible straps 22 individually or simultaneously. A collar member may also be provided that can be moved between first and second positions, wherein the first position allows for adjustments to the seatback 36, while the second position does not allow for adjustments to the seatback 36, but does allow adjustments to the seat 34.

Figure 6:
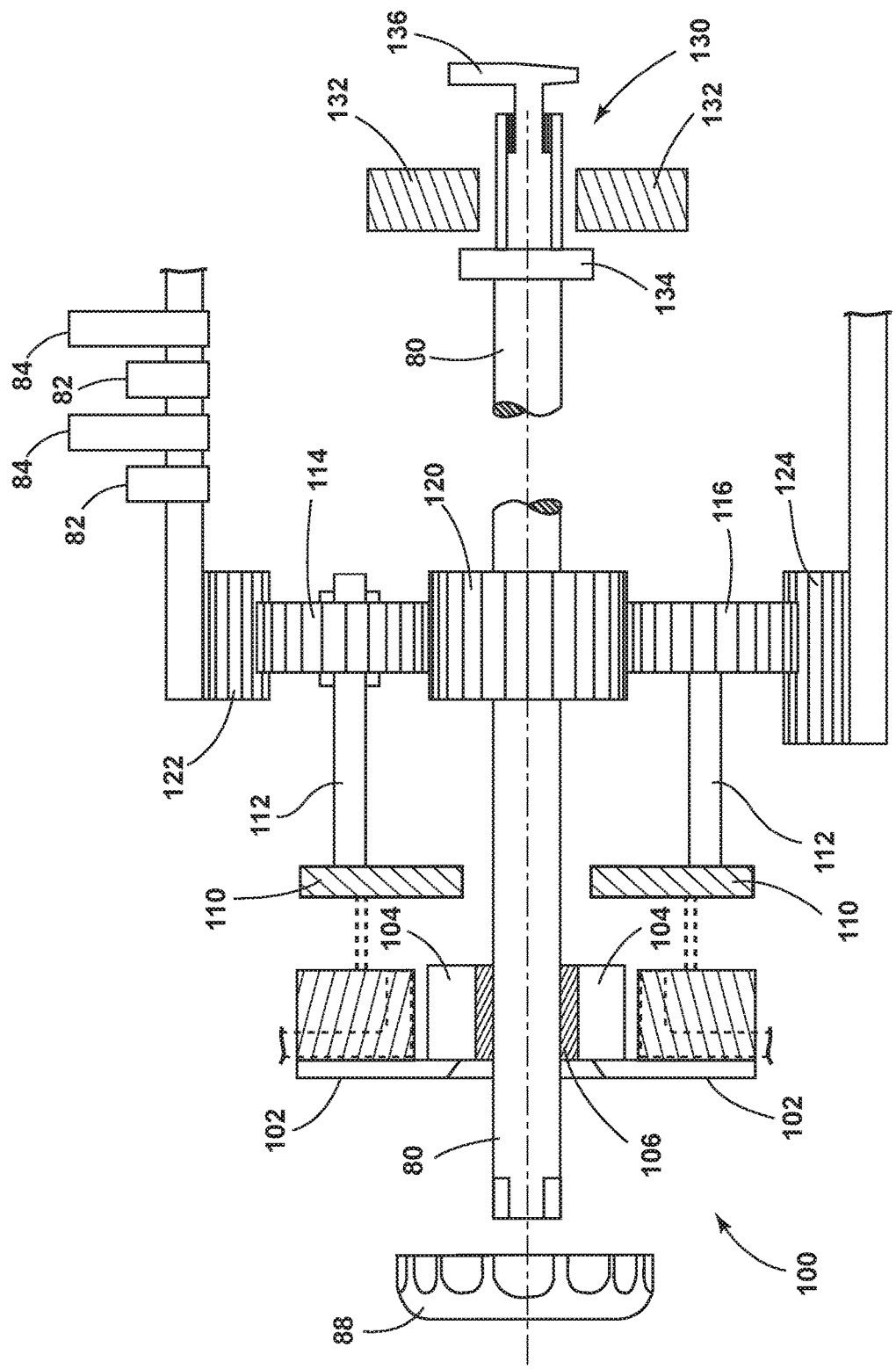
FIG. 6 is a top plan view of a portion of a tensioning system of a vehicle seating assembly of the present disclosure.

With reference now to FIG. 6, one example of a tensioning system 100 that includes a reducer used in conjunction with the tensioning apparatus 50 and the horizontal shaft 80 is illustrated. The tensioning system 100 includes the knob 88 that is operably coupled with the horizontal shaft 80. A frame 102 and a cross member 104 support the horizontal shaft 80. The frame 102 and the cross member 104 interface with the horizontal shaft 80 by a bushing 106 that extends about the horizontal shaft 80. Fixed frame members 110 hold pivot rods 112 that allow first and second planetary gears 114, 116 to rotate. As the first and second planetary gears 114, 116 rotate, the horizontal shaft 80 also rotates. As the knob 88 is turned, the horizontal shaft 80 rotates which also rotates a primary gear 120 (sun gear) rotates, resulting in the planetary gears 114, 116 also rotating. As the planetary gears 114, 116 rotate, annular gears 122, 124 rotate, which are operably coupled with the first and second plurality of cams 82, 84 that interface with the first and second plurality of flexible straps 20, 22. As the first and second plurality of cams 82, 84 move into further contact with or lesser contact with the first and second plurality of flexible straps 20, 22, the first and second plurality of flexible straps 20, 22 increase or decrease in tension. A rear portion 130 of the horizontal shaft 80 extends into a rear frame member 132 and is supported thereby. An internal stop 134 is disposed on an inside portion of the rear frame member 132 and an external stop 136 is disposed on an outside portion of the rear frame member 132. In the event a reducer is not desired, a simpler cam system, such as that shown in FIGS. 1A-5 may be used. Further, it will be understood that variations to this construction may also be contemplated.

Figure 7:
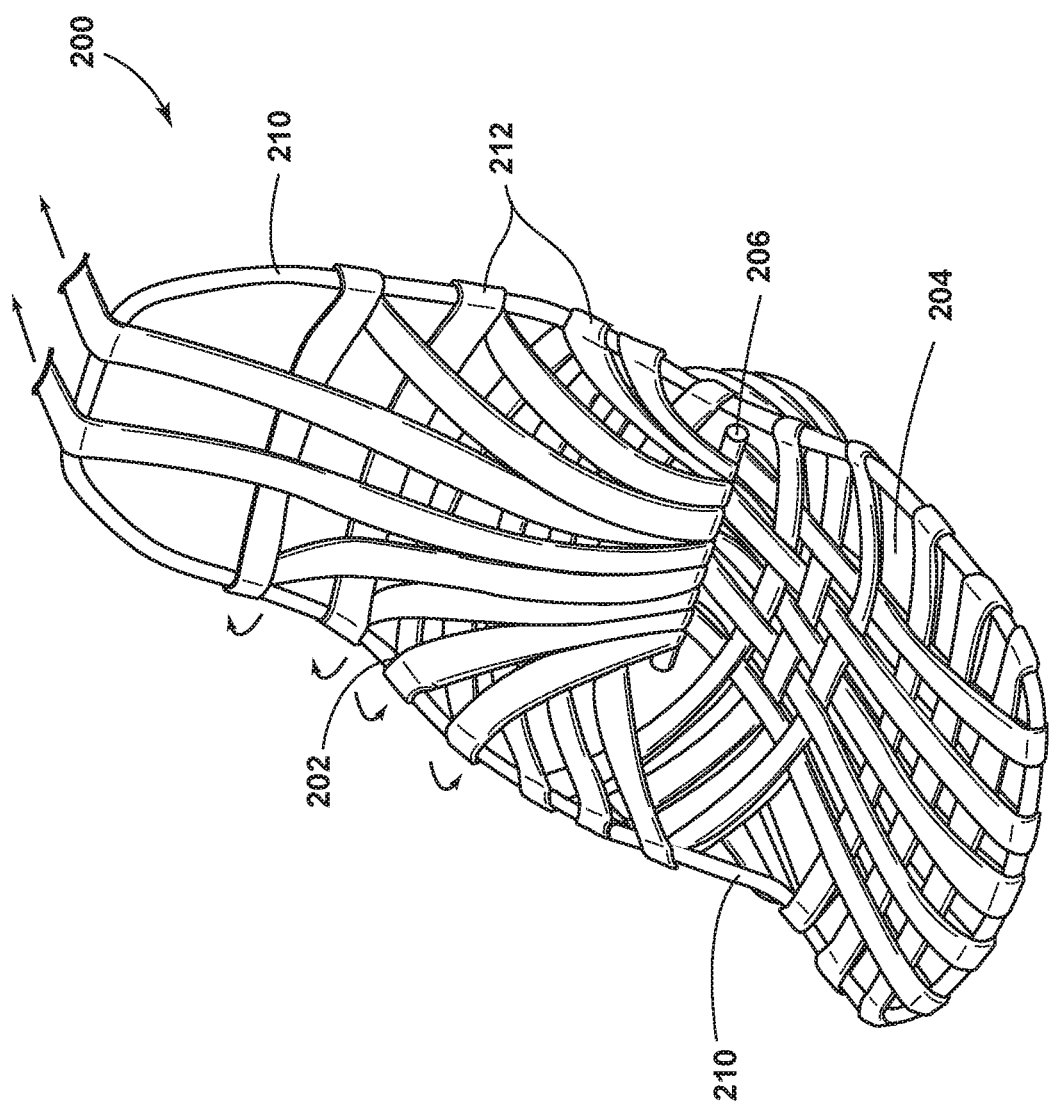
FIG. 7 is a top perspective view of another construction for a vehicle seating assembly of the present disclosure.

With reference now to FIG. 7, in an alternative construction for a seating assembly 200, tension of the seatback 202 and the seat 204 is applied by a rear lateral shaft 206 that is configured to rotate, thereby applying tension to a unitary peripheral frame member 210 of the seat 204 and seatback 202. As the rear lateral shaft 206 rotates, flexible straps 212 rotate around the unitary peripheral frame member 210, thereby increasing or lessening the tension and rigidity of the seatback 202 and the seat 204. The flexible straps 212 may be configured to rotate around the unitary peripheral frame member 210 in different directions. It is also contemplated that different tightening mechanisms may be used and that the flexible straps 212 may stretch or may be substantially non-stretchable.

Figure 8:
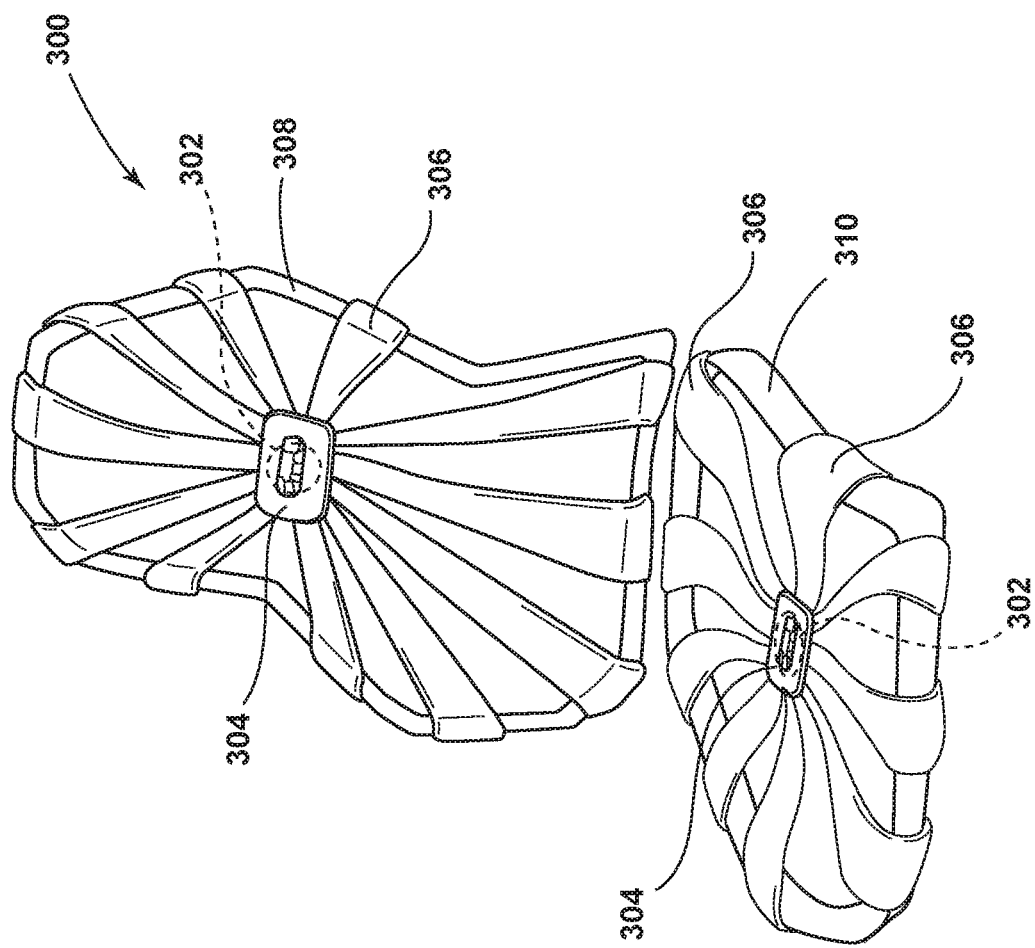
FIG. 8 is a top perspective view of yet another embodiment of a vehicle seating assembly of the present disclosure.

With reference now to FIG. 8, in another construction of a seating assembly 300, a rotational member 302 may be disposed behind a central brace 304. The central brace 304 is centrally located relative to a plurality of flexible straps 306. As the plurality of flexible straps 306 are pulled under tension by the rotational member 302 disposed behind the central brace 304, the plurality of flexible straps 306 increase in tension, thereby stiffening a seatback 308 and/or a seat 310. Any number of flexible straps may be used about the seat 310 or the seatback 308.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A foamless seating assembly comprising:
    a frame including an inner support member and an outer support member;
    a first plurality of flexible straps extending about the inner support member of the frame;
    a second plurality of flexible straps extending about the outer support member of the frame, wherein at least one flexible strap of the second plurality of flexible straps of the outer support member are adjacent to at least one flexible strap of the first plurality of flexible straps of the inner support member; and
    a tension assembly operably coupled with the flexible straps and configured to apply tension to the straps simultaneously, wherein the tension assembly is disposed below a seat supported by the frame, the tension assembly including a horizontal shaft that extends rearwardly below the seat.

2. The foamless seating assembly of claim 1, wherein the inner support member is disposed at each side of the seat and the outer support member is disposed at outermost sides of seat side bolsters.

3. The foamless seating assembly of claim 1, wherein the horizontal shaft includes a first plurality of cams in engagement with the first plurality of flexible straps and a second plurality of cams in engagement with the second plurality of flexible straps.

4. The foamless vehicle seating assembly of claim 1, further comprising:
- a vertical shaft extending upward from the seat and operably coupled with the horizontal shaft, the vertical shaft configured to apply or lessen tension on at least one of a third plurality of flexible straps and at least one of a fourth plurality of flexible straps, wherein the third plurality of flexible straps and fourth plurality of flexible straps are disposed in a seatback of said foamless seating assembly.

5. The foamless seating assembly of claim 1, wherein rotation of the tension assembly results in the application of tension to the first plurality of flexible straps which stiffens the seat supported by the frame.

6. The foamless seating assembly of claim 2, wherein rotation of the tension assembly results in the application of tension to the second plurality of flexible straps which stiffens the seat side bolsters supported by the frame.

7. A vehicle seating assembly comprising:
- a frame defining a seat and a seatback, the frame including an inner support member and an outer support member;
- a first plurality of flexible straps extending about the inner support member;
- a second plurality of flexible straps extending about the outer support member of the frame and disposed adjacent one of the first plurality of flexible straps, wherein a horizontal shaft includes a first plurality of cams in engagement with the first plurality of flexible straps and a second plurality of cams in engagement with the second plurality of flexible straps; and
- a tension assembly operably coupled with the first and second plurality of flexible straps.

8. The vehicle seating assembly of claim 7, wherein the inner support member is disposed at each side of the seat and the outer support member is disposed at outermost sides of seat side bolsters.

9. The vehicle seating assembly of claim 7, wherein the tension assembly is disposed below the seat, the tension assembly operably coupled with the horizontal shaft which extends rearwardly below the seat.

10. The vehicle seating assembly of claim 7, further comprising:
- a vertical shaft extending upward from the seat and operably coupled with the horizontal shaft, the vertical shaft configured to apply or lessen tension on at least one of a third plurality of flexible straps and at least one of a fourth plurality of flexible straps, wherein the third plurality of flexible straps and the fourth plurality of flexible straps are disposed in the seatback of said vehicle seating assembly.

11. The vehicle seating assembly of claim 7, wherein rotation of the tension assembly results in the application of tension to the first plurality of flexible straps which stiffens the seat supported by the frame.

12. The vehicle seating assembly of claim 8, wherein rotation of the tension assembly results in the application of tension to the second plurality of flexible straps which stiffens the seat side bolsters supported by the frame.

13. A vehicle seating assembly comprising:
- a frame including an inner support member and an outer support member;
- a first flexible strap extending about the inner support member;
- a second flexible strap extending out the outer support member of the frame and disposed adjacent to the first flexible strap;
- a tension assembly operably coupled with the first and second flexible straps and configured to apply and lessen tension to the first and second flexible straps; and
- a vertical shaft extending upward from a seat of said vehicle seating assembly and operably coupled with a horizontal shaft, the vertical shaft configured to apply or lessen tension on at least one of a third flexible strap and at least one of a fourth flexible strap, wherein the third flexible strap and the fourth flexible strap are disposed in a seatback of said vehicle seating assembly.

14. The vehicle seating assembly of claim 13, wherein the inner support member is disposed at each side of the seat and the outer support member is disposed at outermost sides of seat side bolsters.

15. The vehicle seating assembly of claim 13, wherein the horizontal shaft includes a first cam in engagement with the first flexible strap and a second cam in engagement with the second flexible strap.

16. The vehicle seating assembly of claim 13, wherein rotation of the tension assembly results in the application of tension to the first flexible strap which stiffens the seat.

17. The foamless vehicle seating assembly of claim 14, wherein rotation of the tension assembly results in the application of tension to the second flexible strap which stiffens the seat side bolsters supported by the frame.

* * * * *